United States Patent
Hei (10) Patent No.: US 10,979,864 B2
(45) Date of Patent: Apr. 13, 2021

(54) DATA COLLECTION SYSTEM, DATA COLLECTION METHOD, AND MESSAGE DELIVERY CONTROL DEVICE

(71) Applicant: TOYOTA INFOTECHNOLOGY CENTER CO., LTD., Tokyo (JP)

(72) Inventor: Yuichiro Hei, Fujimino (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 307 days.

(21) Appl. No.: 16/218,866

(22) Filed: Dec. 13, 2018

(65) Prior Publication Data

US 2019/0289434 A1 Sep. 19, 2019

(30) Foreign Application Priority Data

Mar. 14, 2018 (JP) .............................. JP2018-046748

(51) Int. Cl.
| | |
|---|---|
| *H04W 4/06* | (2009.01) |
| *H04W 72/00* | (2009.01) |
| *H04W 88/18* | (2009.01) |
| *H04W 4/12* | (2009.01) |
| *H04W 4/70* | (2018.01) |

(52) U.S. Cl.
CPC .............. *H04W 4/06* (2013.01); *H04W 4/12* (2013.01); *H04W 4/70* (2018.02); *H04W 72/005* (2013.01); *H04W 88/184* (2013.01)

(58) Field of Classification Search
None
See application file for complete search history.

(56) References Cited

U.S. PATENT DOCUMENTS

| | | | | |
|---|---|---|---|---|
| 2015/0142963 A1* | 5/2015 | Choi | ........................ | H04L 67/28 709/224 |
| 2019/0205541 A1* | 7/2019 | Zimny | ..................... | H04W 4/50 |

FOREIGN PATENT DOCUMENTS

JP 2008-124977 A 5/2008

* cited by examiner

*Primary Examiner* — Robert M Morlan
(74) *Attorney, Agent, or Firm* — Oliff PLC (57) ABSTRACT

A data collection system includes a plurality of receiving-side devices configured to acquire predetermined data, a transmitting-side device configured to collect the predetermined data, and a message delivery control device. The message delivery control device includes at least one processor configured to: store, in a first storage, for each of a plurality of logical channels, information about a receiving-side device with respect to which a delivery request for a message is registered, among the plurality of receiving-side devices; receive, from the transmitting-side device, a message specifying a first logical channel among the plurality of logical channels and requesting for transmission of the predetermined data; extract a predetermined number of receiving-side devices from receiving-side devices with respect to which the delivery request is registered to the first logical channel; and transmit the message received from the transmitting-side device to the predetermined number of receiving-side devices.

7 Claims, 7 Drawing Sheets

EXAMPLE OF SUBSCRIBER MANAGEMENT INFORMATION TABLE

| TOPIC ID | SUBSCRIBER ID |
|---|---|
| T001 | S001, S002, S003, ... |
| ... | ... |
| T00N | SN001, SN002, ... |

DATA COLLECTION SYSTEM, DATA COLLECTION METHOD, AND MESSAGE DELIVERY CONTROL DEVICE

CROSS REFERENCE TO RELATED APPLICATION

This application claims the benefit of Japanese Patent Application No. 2018-046748, filed on Mar. 14, 2018, which is hereby incorporated by reference herein in its entirety.

BACKGROUND

Technical Field

The present disclosure relates to a data collection system, a data collection method, a message delivery control device, and a message delivery control method.

Description of the Related Art

Collection of data using a data delivery system based on a publish-subscribe model is performed. With a data delivery system based on the publish-subscribe model, a subscriber registers to a topic, and when a message is transmitted to the topic from a publisher, the message is delivered to all the subscribers registered to the topic.

In the case where the publish-subscribe model is used for data collection, a publisher is a server that performs data collection, and a subscriber is a device, such as a sensor, that acquires data, for example. In this case, for example, a topic is prepared for each type of data. In this case, for example, a message that is transmitted from the publisher (server) to a topic is a transmission request for data. In this case, when the server (publisher) transmits a transmission request (message) for data to one topic, the transmission request (message) for data is transmitted to all the devices (subscribers) registered to the topic. A device that received the transmission request for data transmits the data to the server.

CITATION LIST

Patent Document

Patent document 1: Japanese Patent Laid-Open No. 2008-124977

SUMMARY

However, although, depending on the purpose of data collection, the number of samples may be possibly fewer than the number of devices registered to a topic, in the case of data collection using the publish-subscribe model as described above, data is transmitted to the server from all the devices registered to the topic.

The present disclosure has its object to provide a data collection system, a data collection method, a message delivery control device, and a message delivery control method that are capable of reducing, in data collection, the number of devices as transmission destinations of a transmission request for data.

One aspect of the present disclosure is a data collection system including a plurality of receiving-side devices configured to acquire predetermined data, a transmitting-side device configured to collect the predetermined data, and a message delivery control device. The message delivery control device includes at least one processor configured to: store in a first storage, for each of a plurality of logical channels, information about a receiving-side device with respect to which a delivery request for a message is registered, among the plurality of receiving-side devices; receive, from the transmitting-side device, a message specifying a first logical channel among the plurality of logical channels and requesting for transmission of the predetermined data; extract a predetermined number of receiving-side devices from receiving-side devices with respect to which the delivery request is registered to the first logical channel; and transmit the message received from the transmitting-side device to the predetermined number of receiving-side devices.

According to the present disclosure, a message requesting for transmission of predetermined data is transmitted to a predetermined number of receiving-side devices that are extracted from receiving-side devices with respect to which a delivery request is registered to the first logical channel, and the predetermined number of pieces of the predetermined data reach the transmitting-side device at the most. The number of data pieces collected at the transmitting-side device may thus be reduced.

According to one aspect of the present disclosure, the at least one processor of the message delivery control device may be configured to receive, from the transmitting-side device, condition information about reception of the predetermined data, together with the message, and extract the predetermined number of receiving-side devices based on the condition information. Alternatively, according to one aspect of the present disclosure, the at least one processor of the message delivery control device may be configured to store in a second storage, in relation to the transmitting-side device, condition information about reception of the predetermined data, and extract the predetermined number of receiving-side devices based on the condition information. The transmitting-side device may thus collect the predetermined data from receiving-side devices that are extracted according to the condition information.

According to one aspect of the present disclosure, the condition information may include a length of a predetermined unit time, and the number of pieces of the predetermined data desired by the transmitting-side device per the predetermined unit time. A message requesting for transmission of predetermined data is thus transmitted to the extracted receiving-side devices every predetermined unit time, and the transmitting-side device may collect the predetermined data for each predetermined unit time, and the collected data pieces can be temporally dispersed.

In the case where the condition information includes the length of the predetermined unit time, and the number of pieces of the predetermined data desired by the transmitting-side device per the predetermined unit time, the at least one processor may be configured to perform, every predetermined unit time, extraction of receiving-side devices amounting to the number of pieces of the predetermined data, from the receiving-side devices with respect to which the delivery request is registered to the first logical channel, and transmission of the message to the receiving-side devices, amounting to the number of pieces of the predetermined data, that are extracted. The receiving-side devices as transmission destinations of a message are thereby re-extracted every predetermined unit time, and thus, the transmitting-side device may collect the predetermined data from a different receiving-side device group in each predetermined unit time, and the collected data pieces can be temporally and spatially dispersed.

The present disclosure may also be understood as a data collection method. According to the data collection method, in a data collection system including a plurality of receiving-side devices configured to acquire predetermined data, a transmitting-side device configured to collect the predetermined data, and a message delivery control device, the message delivery control device stores, in a storage unit, information about a receiving-side device with respect to which a delivery request for a message is registered, among the plurality of receiving-side devices, for each of a plurality of logical channels, receives, from the transmitting-side device, a message specifying a first logical channel among the plurality of logical channels and requesting for transmission of the predetermined data, and extracts a predetermined number of receiving-side devices from receiving-side devices with respect to which the delivery request is registered to the first logical channel, and transmits the message received from the transmitting-side device to the predetermined number of receiving-side devices. The technical ideas disclosed above with respect to the data collection system may also be applied to the data collection method to the extent that no technical conflict exists.

According to the present disclosure, the number of devices as transmission destinations of a transmission request for data may be reduced in data collection.

DESCRIPTION OF THE EMBODIMENT

Hereinafter, an embodiment of the present disclosure will be described with reference to the drawings. The configuration of the following embodiment is merely an example, and the present disclosure is not limited to the configuration of the embodiment.

First Embodiment

<Message Delivery System Based on Publish-Subscribe Model>

Figure 1:
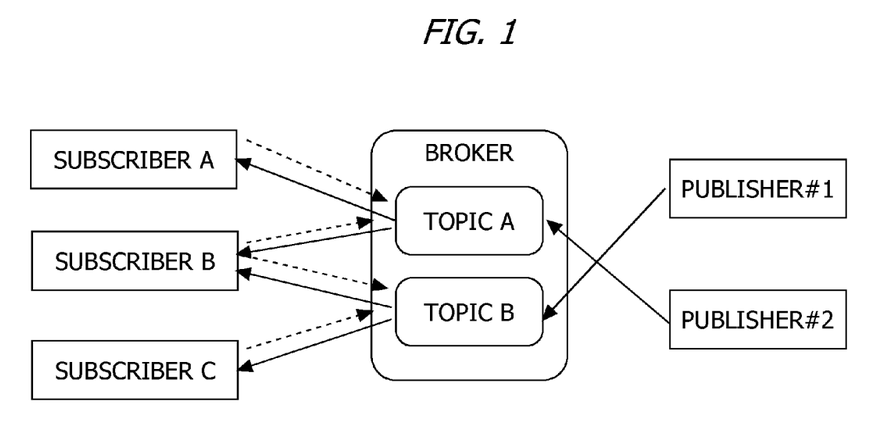
FIG. 1 is a diagram illustrating an example of a message delivery system which is based on a publish-subscribe model.

FIG. 1 is a diagram illustrating an example of a message delivery system 1 which is based on a publish-subscribe model. The message delivery system 1 includes a publisher that transmits a message to a topic, a subscriber that receives a message from a topic to which the subscriber is registered, and a broker that manages a topic. A topic is treated as a logical channel on a device that operates as the broker, for example. A topic is an example of a "logical channel".

A subscriber registers a delivery request for a message to a topic the subscriber is interested in (a broken-line arrow in FIG. 1). In the example illustrated in FIG. 1, a subscriber A registers the delivery request to a topic A. A subscriber B registers the delivery request to the topic A and a topic B. A subscriber C registers the delivery request to the topic B. The broker holds information about a registered subscriber with respect to each topic.

The broker filters messages that are transmitted from the publishers. That is, the broker selects, from messages received from each publisher, a message corresponding to the topic that the subscriber A is registered to, and transmits the message to the subscriber A, for example. In other words, the broker transmits a message that is received from a publisher for a topic, to a subscriber that is registered to the topic. A topic that is a destination of a message is an example of a "first logical channel".

In the example illustrated in FIG. 1, when a publisher #2 transmits a message to the topic A, the message is transmitted to the subscriber A and the subscriber B (solid-line arrows in the drawing). When a publisher #1 transmits a message to the topic B, the message is transmitted to the subscriber B and the subscriber C (solid-line arrows in the drawing).

The operations of the publisher and the broker described above are operations of a message delivery system which is based on a conventional publish-subscribe model. In the first embodiment, the publisher transmits, together with a message, condition information related to delivery of the message.

In the first embodiment, the broker performs a process of transmitting a message to a subscriber, according to the condition information. More specifically, the broker performs, according to the condition information, extraction of a predetermined number of subscribers from subscribers that are registered to a topic that is a destination of a message, and transmission of the message to the extracted subscribers. The number of subscribers that receive a message may thus be made smaller, with respect to one topic, than the number of subscribers that are registered to the topic.

Figure 2:
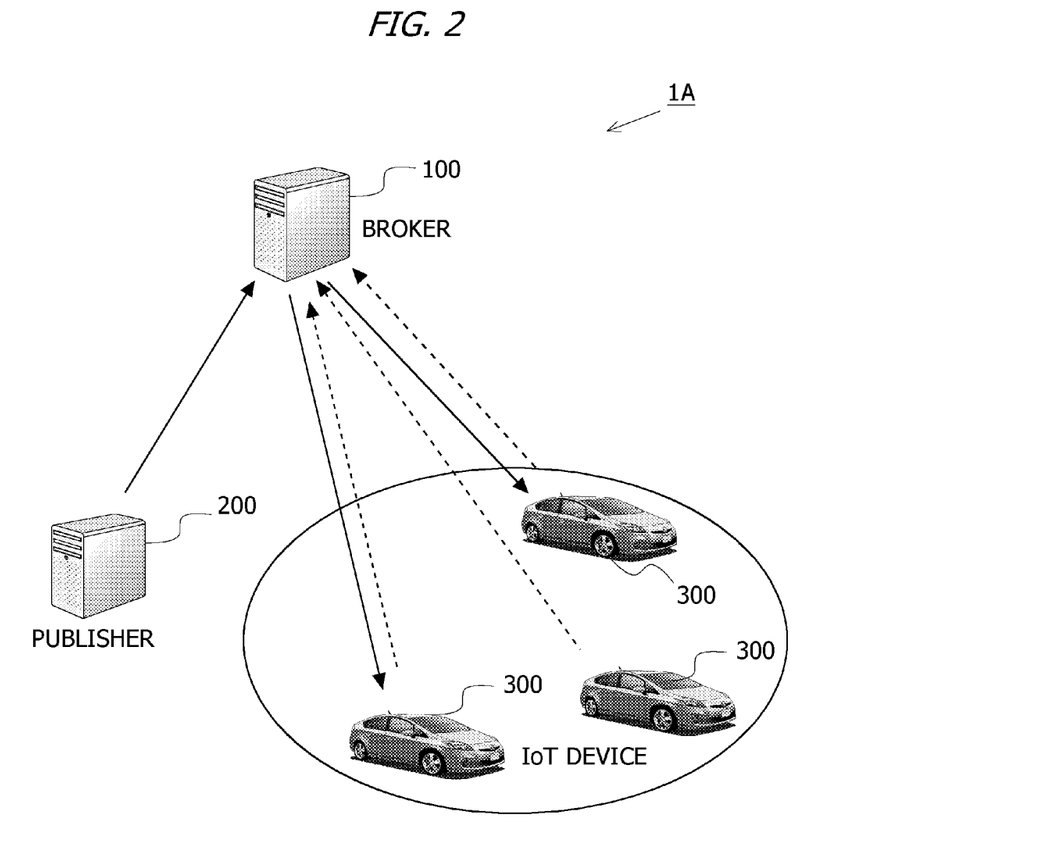
FIG. 2 is a diagram illustrating an example of system configuration of a data collection system adopting the message delivery system.

FIG. 2 is a diagram illustrating an example of system configuration of a data collection system 1A adopting the message delivery system 1. The data collection system 1A includes a server 100 that operates as the broker, a server 200 that operates as the publisher, and a plurality of devices 300 that operate as the subscribers. In the following, the server 100 that operates as the broker will be referred to as a "broker 100". The server 200 that operates as the publisher will be referred to as a "publisher 200". The plurality of devices 300 that operate as the subscribers will be referred to as "subscriber(s) 300". The data collection system 1A is an example of a "data collection system". The broker 100 is an example of a "message delivery control device". The publisher 200 is an example of a "transmitting-side device". The subscriber 300 is an example of a "receiving-side device".

For example, the subscriber 300 is an Internet of Things (IoT) device including various sensors. For example, the sensors may be a global positioning system (GPS) receiver that acquires position information, a gyro sensor, a temperature sensor, a humidity sensor, a magnetic sensor, an illuminance sensor and the like. More specifically, the device 300 is a vehicle, a sensor device, a smartphone, a home appliance, or the like. For example, the broker 100 may be a relay device such as a router, instead of being a server.

With the data collection system 1A, the publisher 200 transmits, as a message, a transmission request for sensor data that is acquired by the device 300 using a sensor. The topic is prepared for each type of sensor data. The publisher 200 transmits, together with the message, identification information of the topic, and the condition information, for example. The message is processed as a message for the topic of the specified identification information. Hereinafter, a topic of the identification information that is transmitted together with a publish message may be referred to as a destination topic of the message, a specified topic, a target topic of the message, or the like. The sensor data is an example of "predetermined data". The transmission request for sensor data is an example of a "transmission request for predetermined data". The condition information is an example of "condition information".

For example, when a message, the identification information of a topic, and the condition information are received from the publisher 200, the broker 100 extracts a predetermined number of subscribers 300 from subscribers 300 that are registered to the specified topic, according to the condition information. The broker 100 transmits the message received from the publisher 200 to the predetermined number of subscribers 300.

The condition information in the message delivery system 1 illustrated in FIG. 1 is information indicating a condition requested by the publisher 200 and regarding delivery of a message. With respect to the data collection system 1A illustrated in FIG. 2 adopting the message delivery system 1, a publish message is a transmission request for sensor data. Accordingly, with respect to the data collection system 1A, the condition information is assumed to be information indicating a condition requested by the publisher 200 and related to reception of sensor data.

For example, in the first embodiment, a condition related to reception of sensor data by the publisher 200 is a maximum number of sensor data pieces that are desired to be acquired per unit time. Accordingly, in the first embodiment, the condition information includes a length of a unit time, and a maximum number of data pieces n that are received per unit time. However, the condition related to reception of sensor data by the publisher 200 and the condition information are not limited thereto.

Additionally, in the case where the condition information is assumed to be information indicating a condition requested by the publisher 200 and related to delivery of a message, condition information including the length of a unit time and the maximum number of data pieces n that are received per unit time indicates that a message is requested by the publisher 200 to be transmitted to n subscribers 300 per unit time. Additionally, a subscriber 300 receiving a transmission request for sensor data does not necessarily acquire sensor data, and thus, in the case where a transmission request for sensor data is transmitted to n subscribers 300, a maximum of n sensor data pieces are collected by the publisher 200.

Accordingly, in the first embodiment, when a message, the identification information of a topic, and the condition information are received from the publisher 200, the broker 100 extracts n subscribers 300 from m (n≤m) subscribers 300 that are registered to the specified topic. The broker 100 transmits the message received from the publisher 200 to the extracted n subscribers 300. For example, the broker 100 stores the condition information in a memory, and thereafter, repeats a process of extracting n subscribers 300 from m subscribers 300 that are registered to the specified topic and of transmitting the message, every unit time period that is specified.

When the broker 100 performs, according to the condition information, every predetermined unit time, extraction of n subscribers 300 and transmission, to the extracted subscribers 300, of a transmission request for sensor data with respect to the publisher 200, the sensor data collected at the publisher 200 may be temporally and spatially dispersed. Data pieces that are temporally and spatially dispersed are effective when used for statistics or the like. This is because, in statistics, an accurate result is sometimes not obtained by biased data.

Temporal dispersion of collected sensor data means that data is collected every predetermined unit time. Spatial dispersion of collected sensor data means re-selection, performed every time data is collected, of n subscribers 300 from subscribers 300 that are registered to a target topic.

Figure 3:
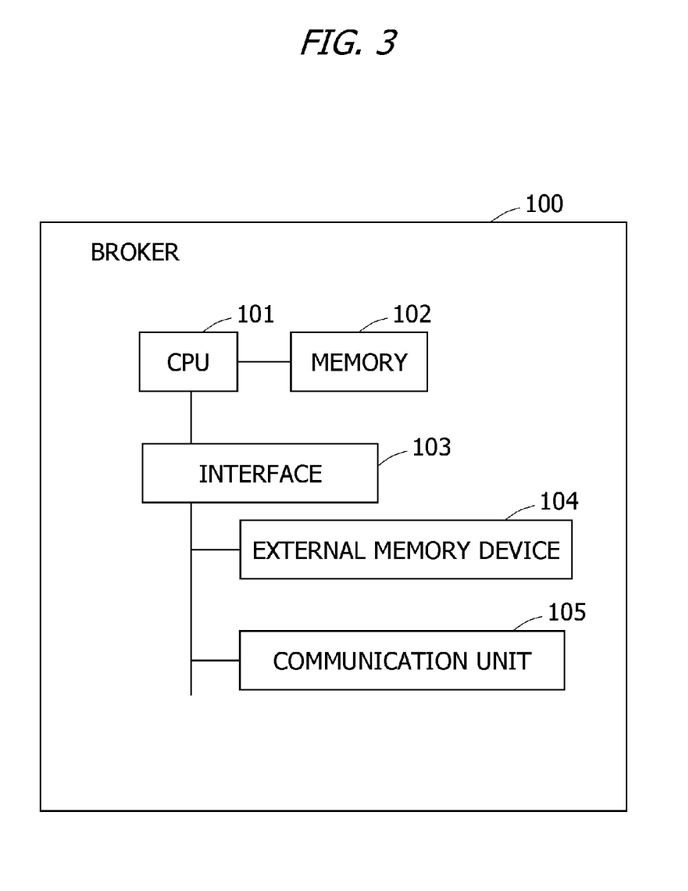
FIG. 3 is a diagram illustrating an example of hardware configuration of the broker.

FIG. 3 is a diagram illustrating an example of hardware configuration of the broker 100. The broker 100 includes a CPU 101, a memory 102, an interface 103, an external memory device 104, and a communication unit 105. The CPU 101 executes computer programs that are executably developed in the memory 102, and performs processing as the broker 100. The memory 102 stores computer programs to be executed by the CPU 101, data to be processed by the CPU 101, and the like. For example, the memory 102 is a dynamic random access memory (DRAM), a static random access memory (SRAM), a read only memory (ROM), or the like.

The external memory device 104 and the communication unit 105 are connected to the interface 103. The external memory device 104 is a non-volatile memory device and is a hard disk drive, a solid state drive (SSD), or the like, for example. The communication unit 105 connects to a public communication network, such as the Internet, through a LAN, and communicates with various servers and the devices 300 on the network through the public communication network, for example.

FIG. 3 illustrates the interface 103 as an example, but exchange of signals between the CPU 101 and a control target is not limited to be performed through the interface 103. That is, the CPU 101 may include a plurality of signal exchange paths other than the interface 103. In FIG. 3, the broker 100 includes a single CPU 101. However, the CPU is not limited to a single processor, and may adopt a multiprocessor configuration. Alternatively, a single CPU connected by a single socket may have a multicore configuration. At least a part of processes of functional components of the broker 100 illustrated in FIG. 4 described later may be performed by a processor other than the CPU, such as a dedicated processor such as a digital signal processor (DSP) or a graphics processing unit (GPU). At least a part of processes of the functional components of the broker 100 illustrated in FIG. 4 described later may be an integrated circuit (IC) or another digital circuit. An analog circuit may be included in at least a part of the functional components of the broker 100 illustrated in FIG. 4 described later.

A hardware configuration of the publisher 200 is approximately the same as that of the broker 100, and illustration thereof is omitted. The hardware configuration of the publisher 200 includes a CPU, a memory, an external memory device, and a communication unit, and the CPU executes computer programs that are executably developed in the memory and performs processing as the publisher 200.

Figure 4:
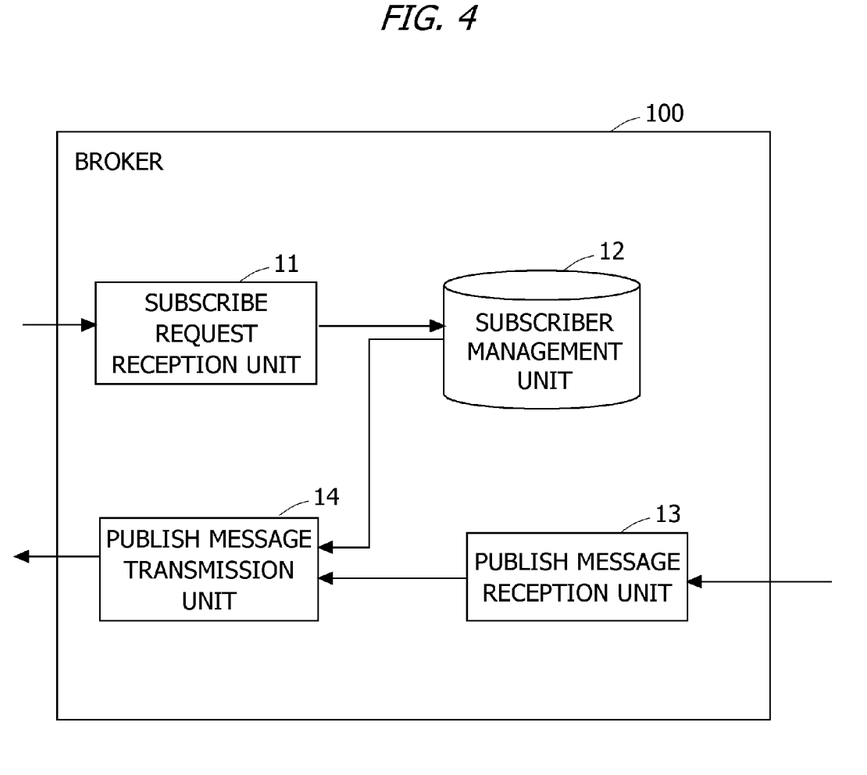
FIG. 4 is a diagram illustrating an example of functional configuration of the broker according to the first embodiment.

FIG. 4 is a diagram illustrating an example of functional configuration of the broker 100 according to the first embodiment. For example, the broker 100 operates as each unit illustrated in FIG. 4 by a computer program in the memory 102. That is, as functional components, the broker 100 includes a subscribe request reception unit 11, a subscriber management unit 12, a publish message reception unit 13, and a publish message transmission unit 14.

The subscribe request reception unit 11 receives a subscribe request that is transmitted from the subscriber 300. The subscribe request is a registration request for delivery request to a topic. Identification information of the subscriber 300, and identification information of a topic that the subscriber 300 wishes to be registered are also received together with the subscribe request, for example. The subscribe request reception unit 11 registers the received identification information of the subscriber 300 and the received identification information of the topic that the subscriber 300 wishes to be registered, in a subscriber management information table held by the subscriber management unit 12 described later.

The subscriber management unit 12 stores the subscriber management information table that is created in the external memory device 104, and that contains information about the subscriber 300 that is registered to each topic. Details of the subscriber management information table will be given later. The subscriber management unit 12 is an example of a "first storage".

The publish message reception unit 13 receives a publish message that is transmitted from the publisher 200. In the first embodiment, the publish message that is transmitted from the publisher 200 is a transmission request for sensor data. Identification information of a topic, and the condition information are also received together with the publish message, for example. The publish message reception unit 13 outputs the received publish message, the received identification information of a topic, and the received condition information to the publish message transmission unit 14.

When the publish message, the identification information of a topic, and the condition information are input from the publish message reception unit 13, the publish message transmission unit 14 extracts the subscribers 300 that are registered to the topic from the subscriber management unit 12. The publish message transmission unit 14 further extracts a predetermined number of subscribers 300 according to the condition information, from the subscribers 300 that are registered to the topic. The publish message transmission unit 14 transmits the publish message received from the publisher 200 to the extracted predetermined number of subscribers 300.

In the first embodiment, the condition information is the unit time, and the maximum number of data pieces n that are desired by the publisher 200 to be received per unit time. Such condition information is an instruction to continuously transmit, every unit time, a publish message to a number of subscribers 300 corresponding to the maximum number of data pieces n. Accordingly, the publish message transmission unit 14 holds, in the memory 102, a publish message, identification information of a topic, and the condition information that are received from the publish message reception unit 13, and thereafter, repeatedly performs, every unit time, transmission of the publish message to the subscribers 300 in the manner described above. Then, for example, when a publish message is received again from the publisher 200 for the same topic, the publish message, the identification information of the topic, and the condition information saved in the memory 102 are rewritten and updated. However, there are cases where the condition information is not received together with the publish message, where the condition information indicates single transmission of the publish message, and the like, and in these cases, the publish message, the identification information of the topic, and the condition information that are saved in the memory 102 are deleted, for example. The memory 102 in which the publish message, the identification information of a topic, and the condition information are saved is an example of a "second storage".

A method of extracting a predetermined number of subscribers 300 from subscribers 300 that are registered to a specified topic is not limited to a predetermined method, as long as extraction is random. For example, as the method of extracting a predetermined number of subscribers 300 from subscribers 300 that are registered to a topic may be a random-based method, a round robin method, a method of performing extraction such that there is no overlap with a previous selection, a method of performing extraction such that there is a distribution based on positions of the subscribers 300, or the like.

Figure 5:
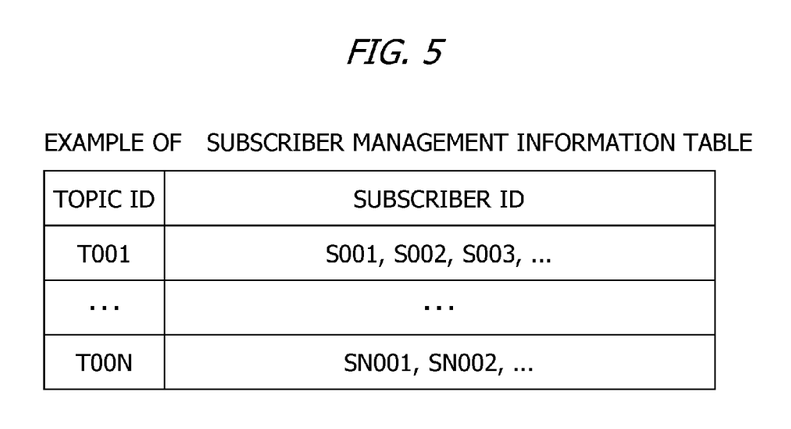
FIG. 5 is an example of the subscriber management information table.

FIG. 5 is an example of the subscriber management information table. The subscriber management information table is stored in the subscriber management unit 12 of the broker 100. The subscriber management information table includes fields of topic ID and subscriber ID.

The identification information of a topic is input in the topic ID field. For example, a topic is defined by a data type and a data collection condition. These information pieces that define a topic will be referred to as "topic definition". The topic definition is set by an operator of the data collection system 1A, for example, and is held in a table not illustrated. For example, the data type is the type of sensor data (for example, position information or a temperature), a captured image or video of a camera, or the like. The data collection condition is a condition related to the device 300 that is the target of data collection. For example, the data collection condition is a region, the type of the device 300, the type of data, and the like that are the targets of data collection. In the case where the data type in the topic definition is a captured image or video of a camera that is mounted on the device 300, the data collection condition in the topic definition may be a captured image or video including the number on a predetermined number plate.

Additionally, the publisher 200 and the subscriber 300 each hold topic definition the same as that of the broker 100. The publisher 200 and the subscriber 300 each, for example, access the broker 100 or a system server, not illustrated, every predetermined period of time, and download latest topic definition, to thereby dynamically and locally update the topic definition. For example, the subscriber 300 refers to the topic definition, and transmits a subscribe request to the broker 100 with respect to a topic with topic definition matching the subscriber 300 itself.

Identification information of a subscriber that is registered to a topic in a corresponding topic ID field for a delivery request for a message is input in the subscriber ID field.

Figure 6:
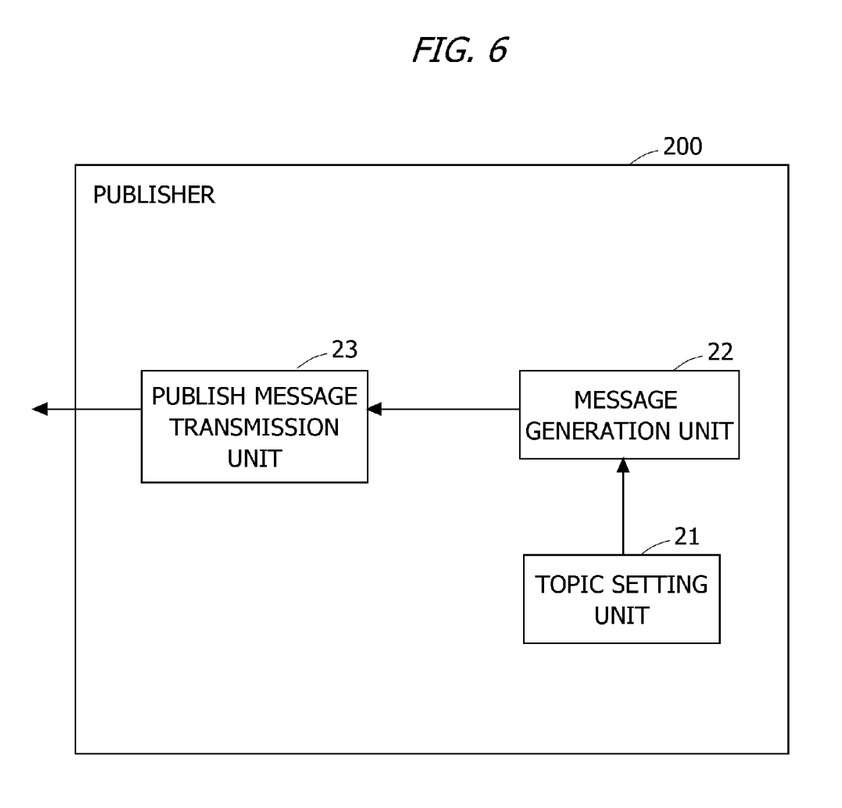
FIG. 6 is a diagram illustrating an example of functional configuration of the publisher.

FIG. 6 is a diagram illustrating an example of functional configuration of the publisher 200. The publisher 200 operates as each unit illustrated in FIG. 6 by a computer program in a memory. That is, as functional components, the publisher 200 includes a topic setting unit 21, a message generation unit 22, and a publish message transmission unit 23.

The topic setting unit 21 sets, for the message generation unit 22, a topic, the identification information of which is to be transmitted together with a publish message that is to be transmitted by the publisher 200. The message generation unit 22 generates a publish message and the condition information, and outputs the publish message and the condition information to the publish message transmission unit 23, together with the identification information of the topic that is set by the topic setting unit 21. In the first embodiment, the publish message is a transmission request for data. The condition information is a unit time, and the maximum number of data pieces n that are desired to be received per unit time. The publish message transmission unit 23 transmits the publish message, the condition information, and the identification information of the topic that are input from the message generation unit 22, to the broker 100.

Setting of a topic as the destination of a publish message is performed based on an input from an administrator of the publisher 200, for example. A publish message may be generated with an input from the administrator of the publisher 200 as a trigger, or with arrival of a timing that is set in advance as a trigger, for example.

<Flow of Processing>

Figure 7:
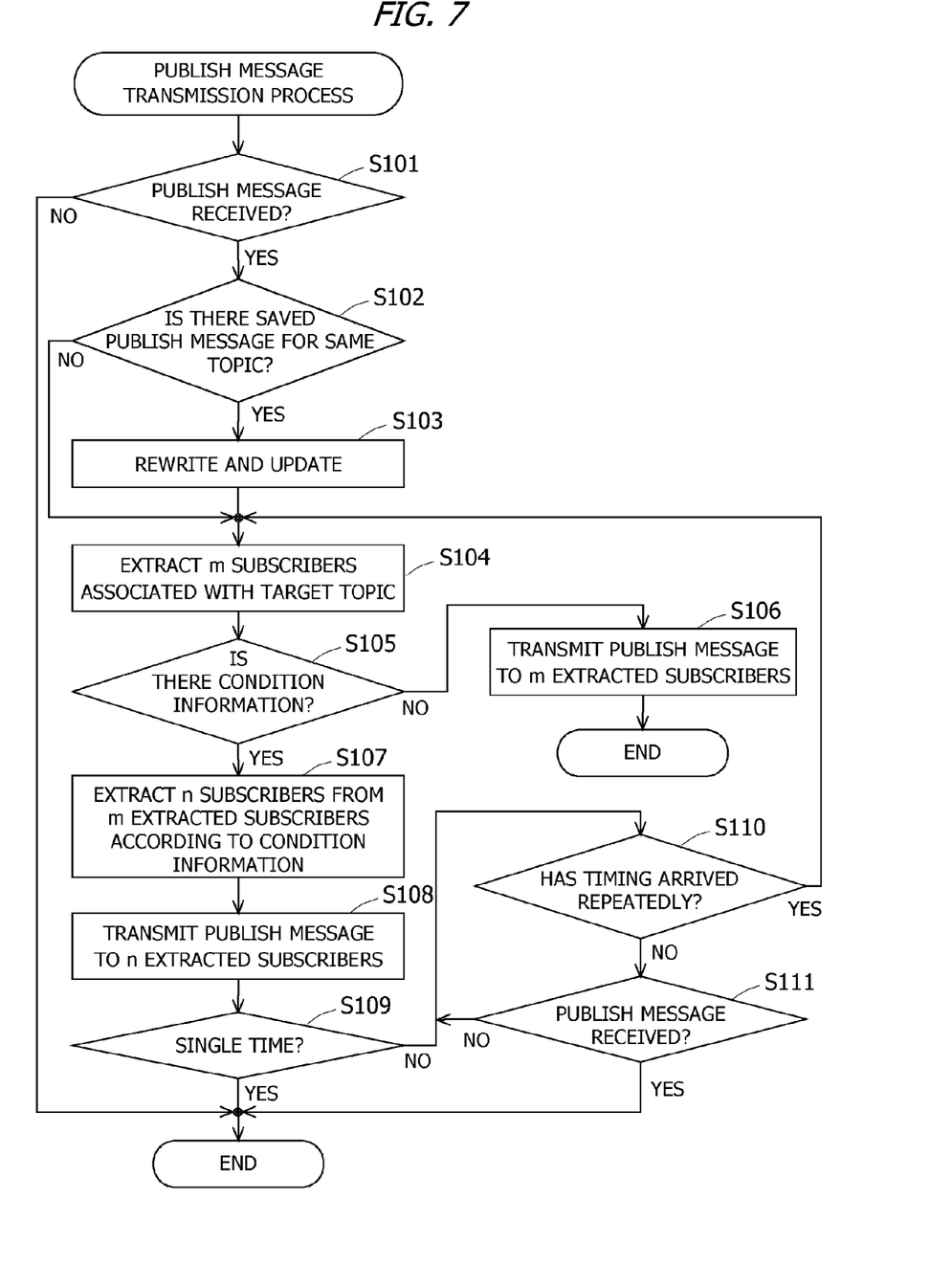
FIG. 7 is an example of a flowchart of processing by the publish message transmission unit of the broker.

FIG. 7 is an example of a flowchart of processing by the publish message transmission unit 14 of the broker 100. The process illustrated in FIG. 7 is repeated every predetermined period, for example. The performer of the process illustrated in FIG. 7 is the CPU 101 of the broker 100, but for the sake of description, a description is given taking the publish message transmission unit 14, which is a functional component, as the performer.

In S101, the publish message transmission unit 14 determines whether a publish message is received or not. The identification information of a topic and the condition information are also received together with the publish message. In the case where a publish message is received (S101: YES), the process proceeds to S102. In the case where a publish message is not received (S101: NO), the process illustrated in FIG. 7 is ended.

In S102, the publish message transmission unit 14 determines whether a publish message and the like for the same topic as the topic specified by the received publish message are saved in the memory 102 or not. In the case where a publish message and the like for the same topic as the topic specified by the received publish message are saved in the memory 102 (S102: YES), the process proceeds to S103. In the case where a publish message and the like for the same topic as the topic specified by the received publish message are not saved in the memory 102 (S102: NO), the process proceeds to S104.

In S103, the publish message transmission unit 14 rewrites and updates the publish message and the like in the memory 102 by the received publish message and the like.

In S104, the publish message transmission unit 14 extracts, from the subscriber management unit 12, subscribers 300 that are registered to the target topic of the received publish message. The number of subscribers 300 registered to the target topic is given as m.

In S105, the publish message transmission unit 14 determines presence/absence of condition information corresponding to the received publish message. In the case where there is the condition information (S105: YES), the process proceeds to S107. In the case where there is no condition information (S105: NO), the process proceeds to S106. In S106, the publish message transmission unit 14 transmits the received publish message to the extracted m subscribers 300. Then, the process illustrated in FIG. 7 is ended.

In S107, the publish message transmission unit 14 extracts n subscribers 300 from the extracted m subscribers 300, according to the condition information. Additionally, n<m is true. In the first embodiment, the maximum number of data pieces n that are desired to be received per unit time is specified in the condition information, and n is the maximum number of data pieces that are desired to be received per unit time. In S108, the publish message transmission unit 14 transmits the publish message to the extracted n subscribers 300.

In S109, the publish message transmission unit 14 determines whether the condition information indicates single transmission of the publish message or not. Additionally, in the first embodiment, the condition information indicates continuous transmission of the publish message. In the case where the condition information indicates single transmission of the publish message (S109: YES), the process illustrated in FIG. 7 is ended. In the case where the condition information does not indicate single transmission of the publish message, or in other words, in the case where the condition information indicates continuous transmission of the publish message (S109: NO), the process proceeds to S110.

In S110, the publish message transmission unit 14 determines whether the timing of transmission of the publish message indicated by the condition information that is saved in the memory 102 has arrived or not. In the first embodiment, the condition information includes the length of a unit time and the maximum number of data pieces n that are desired to be received per unit time, and thus, in S110, whether the length of the unit time has passed from the previous transmission or not is determined. In the case where the timing of transmission of the publish message indicated by the condition information that is stored in the memory 102 has arrived (S110: YES), the process proceeds to S104, and a transmission process is performed according to the condition information that is saved in the memory 102, for the publish message that is saved in the memory 102. In the case where the timing of transmission of the publish message indicated by the condition information that is stored in memory 102 has not arrived (S110: NO), the process proceeds to S111.

In S111, the publish message transmission unit 14 determines whether a publish message specifying the same topic is received or not. In the case where a publish message specifying the same topic is received (S111: YES), the process illustrated in FIG. 7 is ended, and a process illustrated in FIG. 7, for the received publish message, is started. In the case where a publish message specifying the same topic is not received (S111: NO), the process proceeds to S110.

Additionally, the publish message transmission process illustrated in FIG. 7 is merely an example, and the publish message transmission process is not limited thereto.

<Operation and Effects of First Embodiment>

With the data collection system 1A according to the first embodiment, the broker 100 sets the number of subscribers 300 to which a publish message, which is a transmission request for data, is to be transmitted to n, which is smaller than the number of subscribers 300 that are registered to the target topic, according to the condition information that is received together with the publish message, and transmits the publish message. The number of data pieces to be collected at the publisher 200, which is a data collection server, may thus be reduced.

In the first embodiment, the condition information includes a length of a unit time, and the maximum number of data pieces n that are desired to be received per unit time. The broker 100 re-extracts n subscribers 300 from m subscribers 300 registered to a target topic every unit time and transmits a publish message (data transmission request). Data collected at the publisher 200, which is a data collection server, may thus be temporally and spatially dispersed. Alternatively, the broker 100 does not necessarily have to re-extract, every unit time, n subscribers 300 from m subscribers 300 that are registered to a target topic, even in the case where the condition information includes the maximum number of data pieces n that are desired to be received per unit time. However, in this case, the effect is small regarding spatial dispersion of data.

<Others>

In the first embodiment, the condition information is transmitted from the publisher 200 to the broker 100, together with the publish message, but such a case is not restrictive. For example, the condition information may be registered in advance in the memory of the broker 100 for each topic, and the broker 100 may read corresponding condition information from the memory 102 and perform transmission process of a message to the subscribers 300, in a case where a message for a corresponding topic is received.

In the first embodiment, the subscriber 300 transmits a subscribe request to the broker 100 to register a delivery request to a topic, but such a case is not restrictive. For example, a system administrator or the like may register the delivery request from the subscriber 300 to the subscriber management unit 12 of the broker 100 in advance for each topic.

<Recording Medium>

A program for causing a computer, other machines or devices (hereinafter "computer or the like") to achieve processing of the broker 100, the publisher 200, or the subscriber 300 described above may be recorded in a recording medium that can be read by the computer or the like. The computer or the like functions as the broker 100, the publisher 200, or the subscriber 300 described above by reading and executing the program in the recording medium.

Here, the recording medium that can be read by the computer or the like refers to a non-transitory recording medium that can store information such as data and/or programs by means of electrical, magnetic, optical, mechanical or chemical action and can be read from the computer or the like. From among such recording mediums, ones that can be removed from the computer or the like include, for example, a flexible disk, a magnetooptical disk, a CD-ROM, a CD-R/W, DVD, a Blu-ray disk, a DAT, an 8 mm tape and a memory card such as a flash memory. Also, recording mediums fixed to the computer or the like include, e.g., a hard disk and a ROM (read-only memory). Furthermore, an SSD (solid state drive) can be used as either a recording medium that can be removed from the computer or the like or a recording medium fixed to the computer or the like.

What is claimed is:

1. A data collection system comprising:
a plurality of receiving-side devices configured to acquire predetermined data;
a transmitting-side device configured to collect the predetermined data; and
a message delivery control device, wherein
the message delivery control device includes at least one processor configured to:
store, in a first storage, for each of a plurality of logical channels, information about a receiving-side device with respect to which a delivery request for a message is registered, among the plurality of receiving-side devices,
receive, from the transmitting-side device, a message specifying a first logical channel among the plurality of logical channels and requesting for transmission of the predetermined data,
extract a predetermined number of receiving-side devices from receiving-side devices with respect to which the delivery request is registered to the first logical channel, and
transmit the message received from the transmitting-side device to the predetermined number of receiving-side devices.

2. The data collection system according to claim 1, wherein the at least one processor is configured to:
receive, from the transmitting-side device, condition information about reception of the predetermined data, together with the message, and
extract the predetermined number of receiving-side devices based on the condition information.

3. The data collection system according to claim 1, wherein the at least one processor is configured to:
store, in a second storage, in relation to the transmitting-side device, condition information about reception of the predetermined data, and
extract the predetermined number of receiving-side devices based on the condition information.

4. The data collection system according to claim 2, wherein the condition information includes a length of a predetermined unit time, and the number of pieces of the predetermined data desired by the transmitting-side device per the predetermined unit time.

5. The data collection system according to claim 4, wherein the at least one processor is configured to perform, based on the condition information, every predetermined unit time, extraction of receiving-side devices amounting to the number of pieces of the predetermined data, from the receiving-side devices with respect to which the delivery request is registered to the first logical channel, and transmission of the message that is received to the receiving-side devices, amounting to the number of pieces of the predetermined data, that are extracted.

6. A data collection method performed by a message delivery control device of a data collection system including a plurality of receiving-side devices configured to acquire predetermined data, a transmitting-side device configured to collect the predetermined data, and the message delivery control device, the method comprising:
storing, in a storage, information about a receiving-side device with respect to which a delivery request for a message is registered, among the plurality of receiving-side devices, for each of a plurality of logical channels;
receiving, from the transmitting-side device, a message specifying a first logical channel among the plurality of logical channels and requesting for transmission of the predetermined data;
extracting a predetermined number of receiving-side devices from receiving-side devices with respect to which the delivery request is registered to the first logical channel; and
transmitting the message received from the transmitting-side device to the predetermined number of receiving-side devices.

7. A message delivery control device comprising at least one processor configured to:
store, in a storage, for each of a plurality of logical channels, information about a receiving-side device with respect to which a delivery request for a message is registered, among a plurality of receiving-side devices configured to acquire predetermined data;
receive, from a transmitting-side device configured to collect the predetermined data, a message specifying a first logical channel among the plurality of logical channels and requesting for transmission of the predetermined data;

extract a predetermined number of receiving-side devices from receiving-side devices with respect to which the delivery request is registered to the first logical channel; and transmit the message received from the transmitting-side device to the predetermined number of receiving-side devices.

* * * * *